J. E. STANNARD.
SPRING WHEEL.
APPLICATION FILED AUG. 19, 1907.

901,751.

Patented Oct. 20, 1908.
2 SHEETS—SHEET 1.

WITNESSES
A. C. Fairbanks.
H. H. Cutter.

INVENTOR
John E. Stannard,
BY
Webster & Co.,
ATTORNEYS

J. E. STANNARD.
SPRING WHEEL.
APPLICATION FILED AUG. 19, 1907.

901,751.

Patented Oct. 20, 1908.
2 SHEETS—SHEET 2.

WITNESSES
A. C. Fairbanks.
H. H. Cutter.

INVENTOR
John E. Stannard,
BY
Webster & Co.,
ATTORNEYS

UNITED STATES PATENT OFFICE.

JOHN E. STANNARD, OF SPRINGFIELD, MASSACHUSETTS, ASSIGNOR OF ONE-HALF TO FRANCIS J. MILLEA, OF SPRINGFIELD, MASSACHUSETTS.

SPRING-WHEEL.

No. 901,751.        Specification of Letters Patent.        Patented Oct. 20, 1908.

Application filed August 19, 1907. Serial No. 389,144.

*To all whom it may concern:*

Be it known that I, JOHN E. STANNARD, a citizen of the United States of America, residing at Springfield, in the county of Hampden and State of Massachusetts, have invented a new and useful Spring-Wheel, of which the following is a specification.

My invention relates to improvements in vehicle wheels designed for use without pneumatic tires, in which heart-shaped springs are employed in lieu of spokes, as hereinafter set forth.

The objects of my invention are, first, to produce a wheel which possesses inherently most if not all of the characteristics which a pneumatic tire imparts to a wheel of ordinary construction, whereby the expense and uncertainty attending the use of the pneumatic tire are eliminated; second, to provide a wheel of this kind which can be readily repaired in the event that some part thereof becomes broken or otherwise injured; third, to provide a spring wheel which, while being simple in construction and easy to assemble and take apart, is strong and durable without being cumbersome or unduly heavy and is withal eminently practicable and efficient. I attain these objects by the means illustrated in the accompanying drawings, in which—

Figure 1:
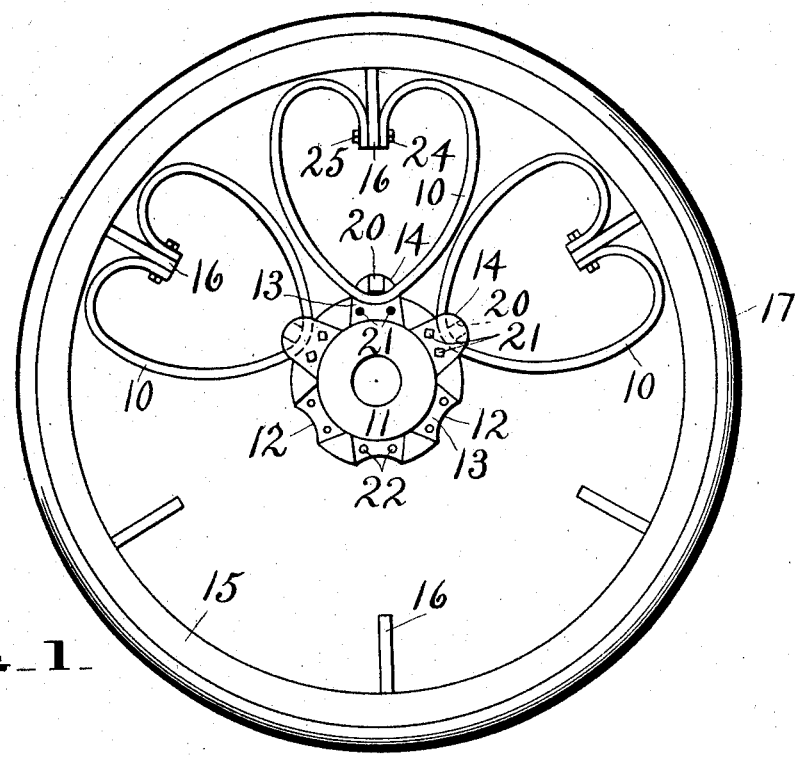
Figure 3:
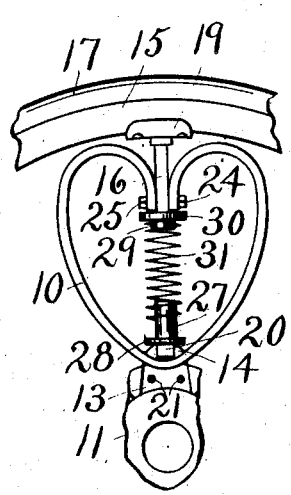
Figure 2:
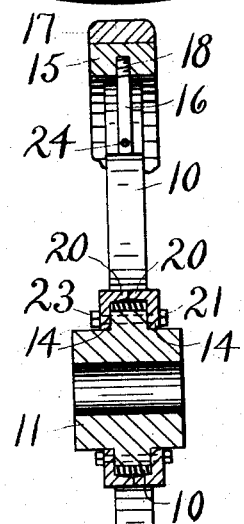
Figure 4:
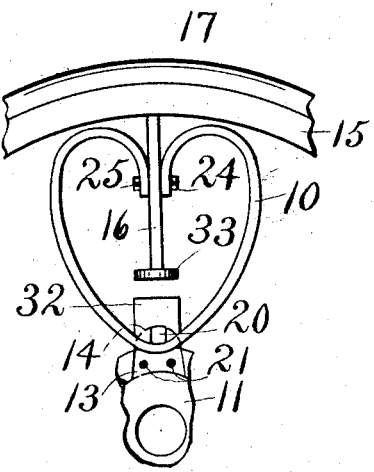
Figure 5:
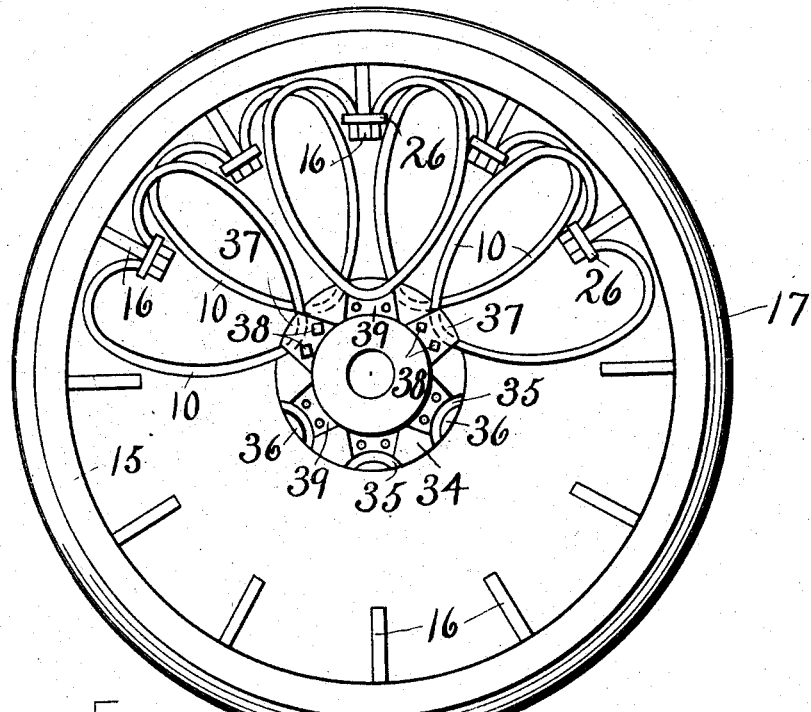

Figure 1 is a side elevation of one form on my wheel; Fig. 2, a cross-section through the hub, rim, and two of the springs, showing clearly how the latter are united with the two former; Figs. 3 and 4, side elevations of portions of two wheels equipped with buffers which differ slightly from each other, structurally; Fig. 5, a side elevation of a wheel made up with two sets of heart-shaped springs, and, Fig. 6, a cross-section, similar to Fig. 2, of the Fig. 5 wheel.

In Figs. 1 and 5 some of the heart-shaped springs are omitted, but provision is made for those which are missing, so that no difficulty will be experienced in understanding how the complete wheel will appear. In each of these two views, moreover, one of the end plates used to confine the apex of one of the springs shown therein, or to assist in confining it, is omitted in order to better illustrate the construction.

Similar figures refer to similar parts throughout the several views.

The spring which I employ in the place of spokes for the purpose of obtaining a wheel construction which will yield readily to any stress or strain and as readily recover itself, in short, which most nearly approaches in the results obtained those produced by the pneumatic tire, is in the form or shape of a heart, since this is believed to be the best if not the only kind of a spring which will yield and return to normal condition to the best advantage in the numerous and particular directions required in a spring wheel. This heart-shaped spring may be rectangular or of any other suitable shape in cross-section, and is open at its indented end to receive a projecting member from the felly or rim of the wheel, to which such end is securely fastened. The apex of said spring is fastened securely to the hub of the wheel, preferably by one of the two methods herein shown. Thus it will be observed that, generally speaking, my invention comprises, primarily, the peculiar spring, and, secondarily, the means by which such spring is retained in position or by which it is incorporated in the wheel.

For a light wheel, such as that illustrated in the first two views, a single set of heart-shaped springs 10 is employed, while for a heavier and stronger wheel, such as that illustrated in the last two views, two sets of such springs are employed, the latter being by preference outwardly or peripherally convergent. In either case the wheel possesses the necessary amount of flexibility and resiliency.

The wheel shown in Figs. 1 and 2 consists, in addition to the heart-shaped springs 10, of a hub 11 of any suitable and ordinary construction except that it has in this case peripheral recesses or seats 12 for the apexes of said springs 10 and end recesses 13 for plates 14 presently to be described, a rim 15 of either wood or metal provided with interior rods 16 which are radial to the axis of the wheel and to which the separated ends of the springs are attached, and a solid rubber tire 17. The rods 16 may be screwed into the rim 15, if it be of metal, in the usual manner, as shown at 18 in Figs. 2 and 6, or they may be secured to the rim by means of ordinary spoke plates, if said rim be of wood, one such plate appearing at 19 in Fig. 3.

There is a pair of plates 14 for each spring 10, in the above-described wheel, and such plates are received into two of the oppositely disposed recesses 13 and project beyond the periphery of the hub 11 both sides of the apex of the associated spring. Each plate 14 is provided with a tongue 20, at its projecting terminal, which engages the apex of said spring and so assists in retaining the apex in place in the associated seat 12. The tongues 20 of each pair of plates may be tapered on their inner faces, as best shown in Fig. 2, for the purpose of drawing the apex of the spring onto or into its seat when said plates are secured in position, and each of such tongues extends half way across the apex so that the two tongues meet in the center thereof, although they might be shorter so as not to meet, without its making any essential difference. Each pair of plates is fastened to the hub by means of bolts 21 passing through holes in the plates and through holes 22 in said hub, and by nuts 23 on said bolts.

The severed ends of each spring 10 are secured to opposite sides of the associated rod 16 either by means of a bolt 24 passing through the spring terminals and through the rod, with a nut 25 on the threaded end of such bolt, as indicated in the first four views, or by means of a band or clip 26, shown in the last two views, slipped on over such terminals and the rod and fastened in any suitable manner, or simply forced on to the same with a driving fit. The wheel thus made up with a single set of heart-shaped springs is entirely adequate for light work, but its power of resistance may be increased, so that it is capable of withstanding a more severe shock and of sustaining a greater load without injury to itself than would otherwise be possible, by adding a buffer to the construction, such buffer being in the form of an auxiliary spring or of a cushion, either of which constitutes a medium adapted to yieldingly receive and absorb, as it were, any unusual shock and to take care of or support any excessive load.

The spring buffer is shown in Fig. 3, and the cushion buffer in Fig. 4, and these will next be described in the order mentioned. In the first instance, a post 27, provided with a flange 28 at the end adjacent to the hub 11, is rigidly attached to each pair of plates 14 or to one of the plate tongues, in any suitable manner, a post 29, provided with a flange 30, is formed on the corresponding rod 16 inside of the attached spring 10, said flange 30 being immediately adjacent to the severed ends of said spring, and an auxiliary or buffer spring 31 is carried by said posts between said flanges, the spring 31 being fastened generally at one end to one of the supporting members therefor at that end, to prevent said spring from rattling. In the drawing the spring 31 is represented as being fastened to the post 29. This buffer spring is usually shorter than the normal distance between the flanges 28 and 30 and does not exert any influence on the wheel except when the latter is heavily loaded or in case it is subjected to a severe shock; at such a time the auxiliary spring is brought into action, by first being actuated into contact with the flange 28 and then compressed, to relieve the inclosing heart-shaped spring and prevent the same from being broken or unduly strained. As soon as the normal conditions are restored or the exciting cause is removed the resilient members resume their former relative positions. In the second instance, a buffer cushion 32, of rubber or other suitable material, is attached by any convenient method between each pair of plates 14 over or outside of their tongues, and the corresponding rod 16 is made longer than in the other cases and provided with an enlarged part or head 33 at its inner end. While normal conditions prevail the head 33 is out of contact with the cushion 32, but in the event of abnormal conditions occurring, such as already have been suggested, said head is forced into contact with said cushion, and the latter being of yielding material lessens the impact or supports the load with some degree of resiliency, whichever may be the cause of its being brought into active service, while relieving and protecting the inclosing heart-shaped spring.

The buffers, either style, in a wheel equipped therewith, may be employed with every heart-shaped spring in the wheel as hereinbefore intimated, or with only certain of such springs—every other one, for example.

Figure 6:
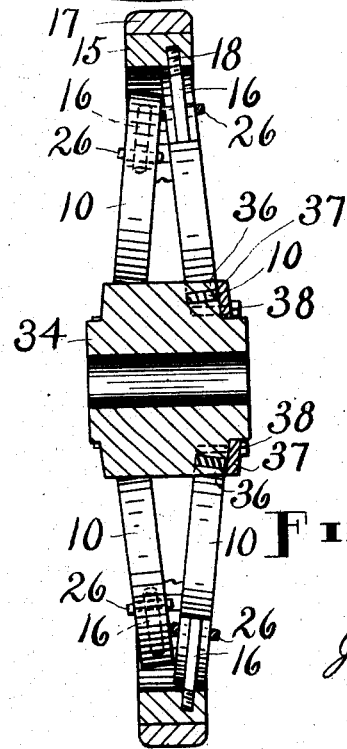

If two sets of springs 10 are used, as in Figs. 5 and 6, I fasten their severed terminals to the rods 16 in either of the two ways described, but prefer to provide a tongue on the hub and a tongueless plate for the apex of each spring. The springs are generally arranged so that those on one side of the wheel set by or overlap those on the other side, as shown. An increased number of rods 16 is required, of course, and they are set with reference to the axis of the hub at angles corresponding to the angles of the attached springs. This hub, 34, has recesses or seats 35 in both ends, alternately arranged, for the apexes of the springs 10, and are provided with tongues 36 on which said apexes are anchored. A plate 37 is bolted at 38 against the end of the hub 34 to hold each spring apex in place on its seat 35 and inside of its tongue 36, such plate being large enough to project over and beyond the adjacent edge of that portion of the apex which is engaged by said tongue. In this matter a much stronger and more durable wheel than that herein first described is produced, although the two wheels do not greatly differ from each other in the essential features of their construction. End recesses 39 may be provided in the hub 34 for the plates 37.

The buffers herein shown and explained can be employed with the wheel just described, but it is thought that ordinarily they will not be needed.

Should it be necessary for any reason to remove any spring 10, it can be done very readily by taking off one or both of the plates 14 which confine the particular spring, on the one hand, or the plate 37 which confines it, on the other hand, and disconnect said spring from its rod 16, hence it is obvious that repairs can be made without taking down more of the wheel than is involved in the injury.

When not under compression, except such as is necessary to give them their shape, and even when under a certain amount of compression, the springs 10 should not touch each other nor should they touch the rim of the wheel.

What I claim as my invention, and desire to secure by Letters Patent, is—

1. A spring wheel comprising a hub, a rim provided with inwardly projecting members, a plurality of independent heart-shaped springs closed at their apexes and severed at their indented ends to receive such inwardly projecting members between them, means to attach such apexes to said hub, and means to fasten the severed terminals to said inwardly projecting members.

2. The combination, in a wheel, of a hub, a rim provided with radial rods, a plurality of heart-shaped springs having closed apexes and inturned terminals to bear against said rods, means comprising tongues and plates to fasten said apexes to said hub, and means to fasten said inturned terminals at the indented ends of said springs to said rods.

3. The combination, in a wheel, of a plurality of independent heart-shaped springs closed at their apexes, a hub having peripheral recesses or seats for such apexes, a rim provided with radial rods entering between the inturned terminals of the springs, means comprising tongues and plates to fasten said apexes in such seats, and means to fasten said inturned terminals at the indented ends of said springs to said rods.

4. The combination, in a wheel, of a hub, a rim, a plurality of independent heart-shaped springs closed at their apexes, means to fasten said apexes to such hub, means to connect the indented ends of said springs with said rim, and buffers carried by the aforesaid fastening and connecting means for said springs, located between the apexes and the indented ends of the springs, and so arranged as to be brought into active service only when the heart-shaped springs are so abnormally disposed as to cause their ends to be brought within a predetermined distance of each other which is less than any normal distance between such ends.

JOHN E. STANNARD.

Witnesses:
S. S. TAFT.
F. A. CUTTER.